United States Patent
Deng et al.

(10) Patent No.: US 10,836,287 B1
(45) Date of Patent: Nov. 17, 2020

(54) VEHICLE SEAT

(71) Applicant: Ford Global Technologies, LLC, Dearborn, MI (US)

(72) Inventors: Zhibing Deng, Northville, MI (US); Jesus Alfonso Alarcon Hernandez, Toluca (MX); Eric D. Veggian, Superior Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/402,316

(22) Filed: May 3, 2019

(51) Int. Cl.
*B60N 2/68* (2006.01)
*B60R 21/207* (2006.01)
*B60R 22/26* (2006.01)
*B60R 22/18* (2006.01)
*B60R 21/02* (2006.01)

(52) U.S. Cl.
CPC ............ *B60N 2/688* (2013.01); *B60R 21/207* (2013.01); *B60R 22/26* (2013.01); *B60R 2021/022* (2013.01); *B60R 2022/1818* (2013.01); *B60R 2022/263* (2013.01)

(58) Field of Classification Search
CPC ...... B60N 2/688; B60N 2/4235; B60R 21/207
See application file for complete search history.

(56) References Cited

U.S. PATENT DOCUMENTS

| | | | |
|---|---|---|---|
| 5,556,129 A * | 9/1996 | Coman | B60R 21/207 280/730.2 |
| 5,651,582 A * | 7/1997 | Nakano | B60R 21/207 280/730.2 |
| 5,704,638 A * | 1/1998 | Lane, Jr. | B60R 21/207 280/730.2 |
| 5,779,263 A * | 7/1998 | Lane, Jr. | B60R 21/201 280/728.2 |
| 5,803,486 A | 9/1998 | Spencer et al. | |
| 6,089,594 A * | 7/2000 | Hasegawa | B60N 2/42 280/728.2 |
| 6,113,135 A * | 9/2000 | Tsutsumi | B60R 21/207 280/730.2 |
| 6,231,068 B1 * | 5/2001 | White, Jr. | B60R 21/207 280/728.2 |
| 7,669,889 B1 * | 3/2010 | Gorman | B60R 21/207 280/730.2 |
| 7,677,598 B1 | 3/2010 | Ryan et al. | |
| 7,806,440 B2 | 10/2010 | Clute | |
| 8,171,868 B2 * | 5/2012 | Evans | B60N 2/58 112/475.08 |
| 8,177,256 B2 | 5/2012 | Smith et al. | |
| 8,998,248 B2 * | 4/2015 | Shankar | B60N 2/42718 280/728.2 |
| 9,834,166 B1 * | 12/2017 | Line | B60R 21/207 |

(Continued)

FOREIGN PATENT DOCUMENTS

DE 102011056672 A1 * 6/2013 ............ B60R 21/207

*Primary Examiner* — Timothy J Brindley
(74) *Attorney, Agent, or Firm* — Frank A. MacKenzie; Bejin Bieneman PLC

(57) ABSTRACT

A vehicle seat includes a frame member including an outer wall and an inner wall, the outer wall and the inner wall defining a cavity therebetween and a side airbag supported by the frame member in the cavity, wherein the outer wall extends along an outboard angle relative to a seat-forward direction and the side airbag is inflatable to an inflated position extending along the outboard angle.

20 Claims, 4 Drawing Sheets

(56) References Cited

U.S. PATENT DOCUMENTS

| | | | |
|---|---|---|---|
| 10,071,705 | B2 | 9/2018 | Tanabe et al. |
| 2005/0067817 | A1 | 3/2005 | Bostrom et al. |
| 2016/0347225 | A1* | 12/2016 | Hayashi ................. B60N 2/688 |
| 2017/0282833 | A1 | 10/2017 | Nagatsu |
| 2019/0176740 | A1* | 6/2019 | Hioda ................... B60R 21/231 |
| 2020/0047710 | A1* | 2/2020 | Jabusch ................. B60R 22/26 |

* cited by examiner

VEHICLE SEAT

BACKGROUND

Vehicle seats may include seat-integrated restraints. The seat-integrated restraint restrains an occupant in the seat. Specifically, the seat-integrated restraint may include a seatbelt assembly including a retractor mounted to a frame of the seat.

Vehicle seats may include energy absorbers, e.g., side airbags. During a vehicle impact, the energy absorbers controls the kinematics of an occupant in the seat. The size and shape of the seat-integrated restraints and the energy absorbers may have competing design factors with respect to space and packing. There remains an opportunity to design a vehicle seat that incorporates the seat-integrated restraint and the energy absorbers.

DETAILED DESCRIPTION

Figure 1:
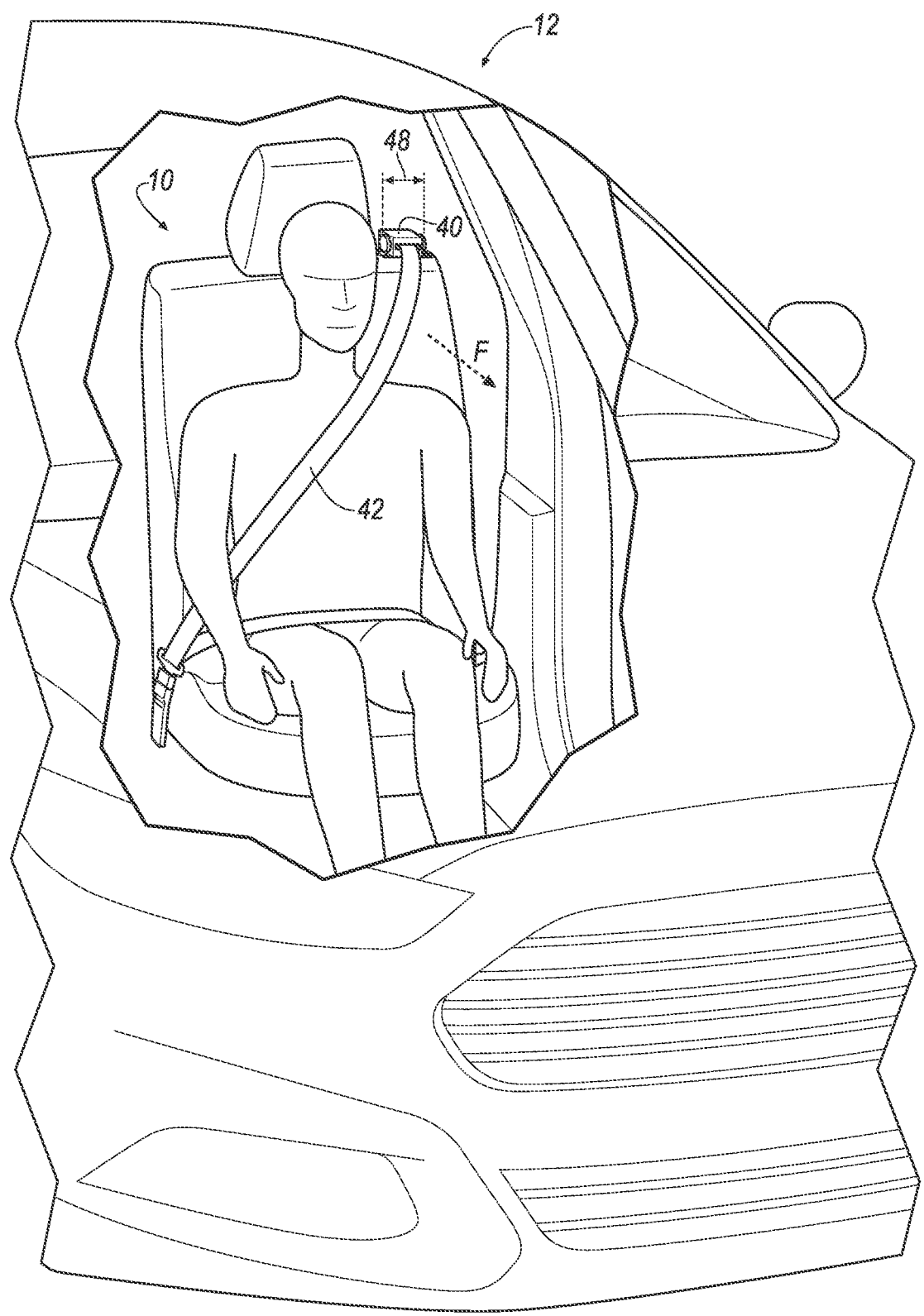
FIG. 1 is a perspective view of a vehicle seat.

A vehicle seat includes a frame member including an outer wall and an inner wall, the outer wall and the inner wall defining a cavity therebetween and a side airbag supported by the frame member in the cavity. The outer wall extends along an outboard angle relative to a seat-forward direction and the side airbag is inflatable to an inflated position extending along the outboard angle.

The vehicle seat may further include a seatbelt retractor fixed to the frame member with the side airbag is disposed beneath the seatbelt retractor.

The seatbelt retractor may be between the outer wall and the inner wall.

The seatbelt retractor may be fixed to a top of the frame member.

The frame member may have a member width and the seatbelt retractor may have a retractor width that is greater than the member width.

The inner wall may extend along a second outboard angle relative to the seat-forward direction.

The inner wall may extend along a second angle relative to the seat-forward direction that is different than the outboard angle.

The vehicle seat may further include a stud and an inflator connected to the side airbag, the stud connecting the inflator to the frame member.

The vehicle seat may further include a second frame member elongated generally in a plane, the second frame member transverse to the frame member, wherein the seat-forward direction may be normal to the plane.

The vehicle seat may further include a rear wall connecting the outer wall and the inner wall.

The vehicle seat may further include an upper wall above the outer wall and the inner wall and a lower wall below the outer wall and the inner wall.

The side airbag may engage the upper wall and the lower wall in the inflated position.

The vehicle seat may further include a seatbelt retractor above the upper wall.

The frame member may be open in a direction along the outboard angle.

The outer wall and the inner wall may be integral.

The side airbag may be designed to inflate away from an occupant in the vehicle seat.

A vehicle seat frame includes a first frame member including an outer wall and an inner wall defining a cavity therebetween, a second frame member transverse to the first frame member and elongated generally in a plane, and an airbag module supported by the first frame member in the cavity. The outer wall defines an outboard angle relative to an axis normal to the plane of the second frame member and the airbag module includes an airbag inflatable to an inflated position along the outboard angle.

The inner wall may define a second outboard angle relative to the axis.

The first frame member may further include a rear wall connecting the outer wall and the inner wall.

The vehicle seat frame may further include a seatbelt retractor disposed at a top of the first frame member, wherein the airbag module may be disposed beneath the seatbelt retractor.

With reference to the Figures, wherein like numerals indicate like parts throughout the several views, a vehicle seat 10 in a vehicle 12 includes a frame member 14 including an outer wall 16 and an inner wall 18, the outer wall 16 and the inner wall 18 defining a cavity 20 therebetween and a side airbag 22 supported by the frame member 14 in the cavity 20, wherein the outer wall 16 extends along an outboard angle relative to a seat-forward direction F and the side airbag 22 is inflatable to an inflated position extending along the outboard angle.

Placing the side airbag 22 in the cavity 20 of the frame member 14 provides space for the side airbag 22 to deploy and directs the side airbag 22 primarily forward with limited upward and downward expansion. The outboard angle of the frame member 14 allows the side airbag 22 to deploy outboard relative to the rest of the seat 10, avoiding interference with an occupant.

The seat 10 defines a seat-forward direction F, as shown in FIGS. 1-4. The seat-forward direction F is a direction extending out from the seat 10. For example, the seat-forward direction F may be perpendicular to a vehicle-crosswise direction. The seat 10 may be rotatable away from a neutral position, and when the seat 10 is in the neutral position, the seat-forward direction F is a vehicle-forward direction. The frame member 14 may extend away from the seat-forward direction F, e.g., outboard of the seat-forward direction F.

Figure 2:
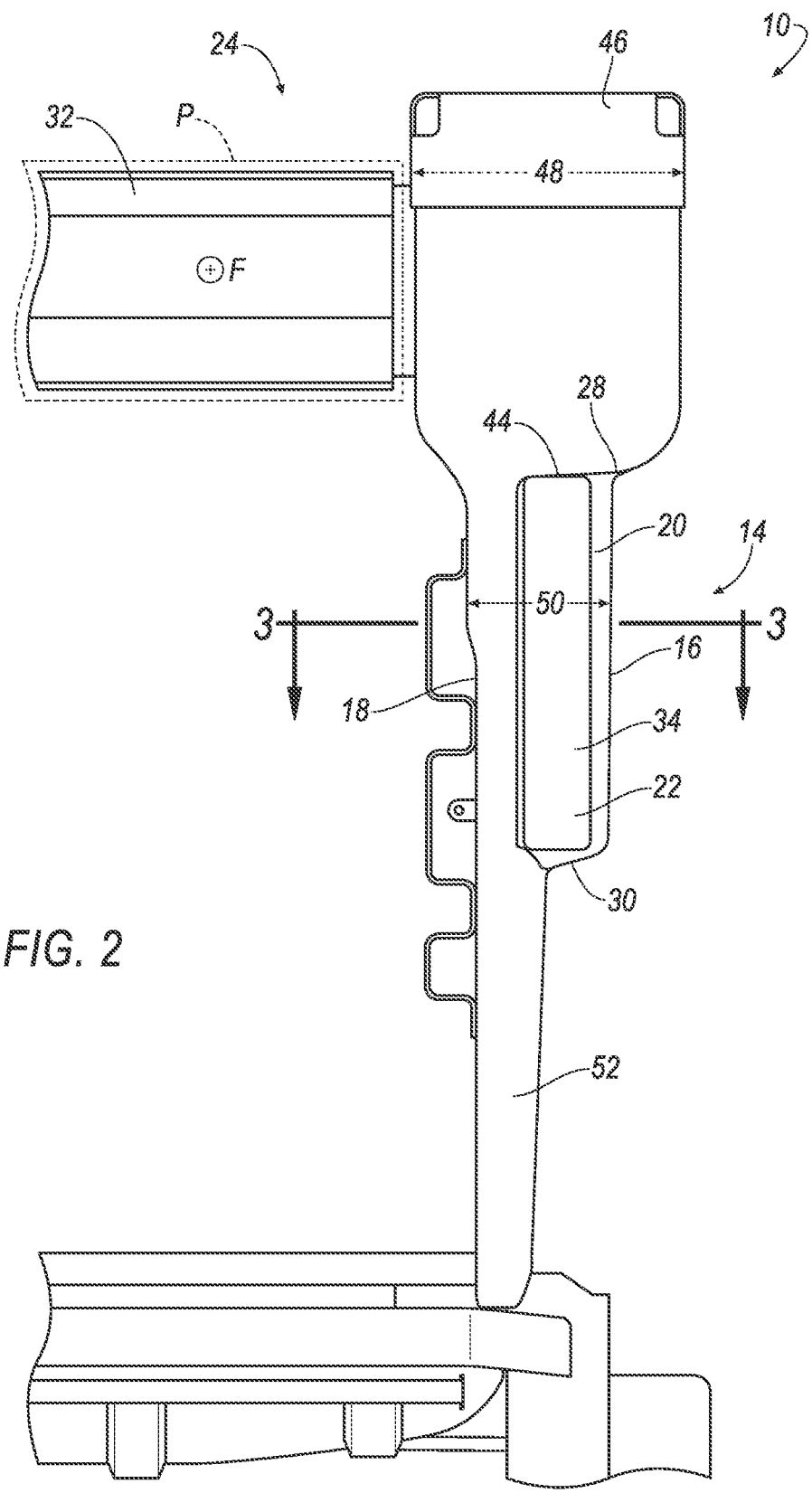
FIG. 2 is a front view of a seat frame.

The seat 10 includes a frame 24, as shown in FIG. 2. The frame 24 includes the frame member 14. The frame 24 supports the occupant in the seat 10. The frame member 14 has a top 44, i.e., an uppermost portion of the frame member 14. The frame 24 may be formed of any suitable plastic material, e.g., carbon fiber reinforced plastic (CFRP), glass fiber-reinforced semi-finished thermoplastic composite (organosheet), etc. As another example, some or all components of the frame 24 may be formed of a suitable metal, e.g., steel, aluminum, etc.

Figure 3:
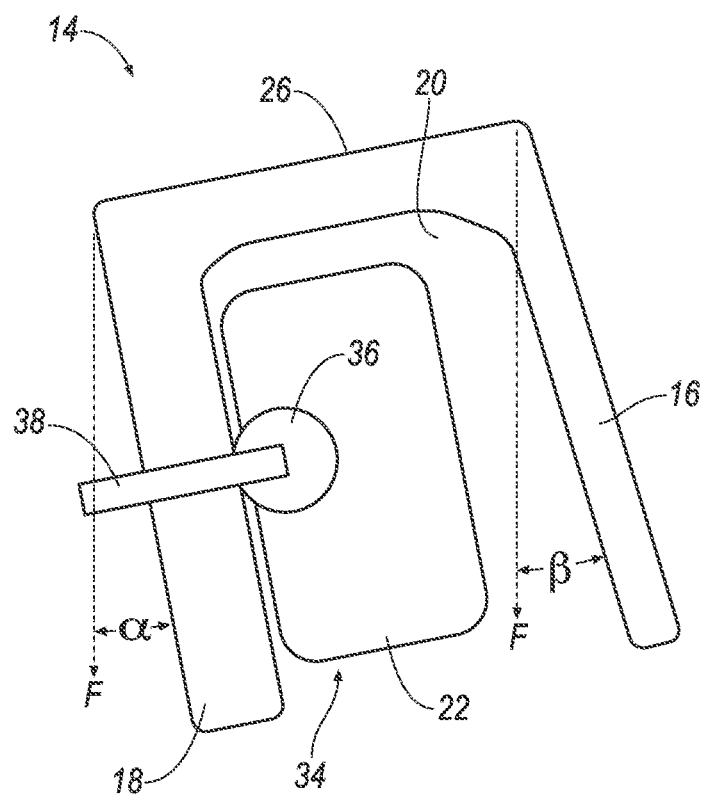
FIG. 3 is a cross-sectional view of the seat frame at line 3 in FIG. 2 with a side airbag in an uninflated position.
Figure 4:
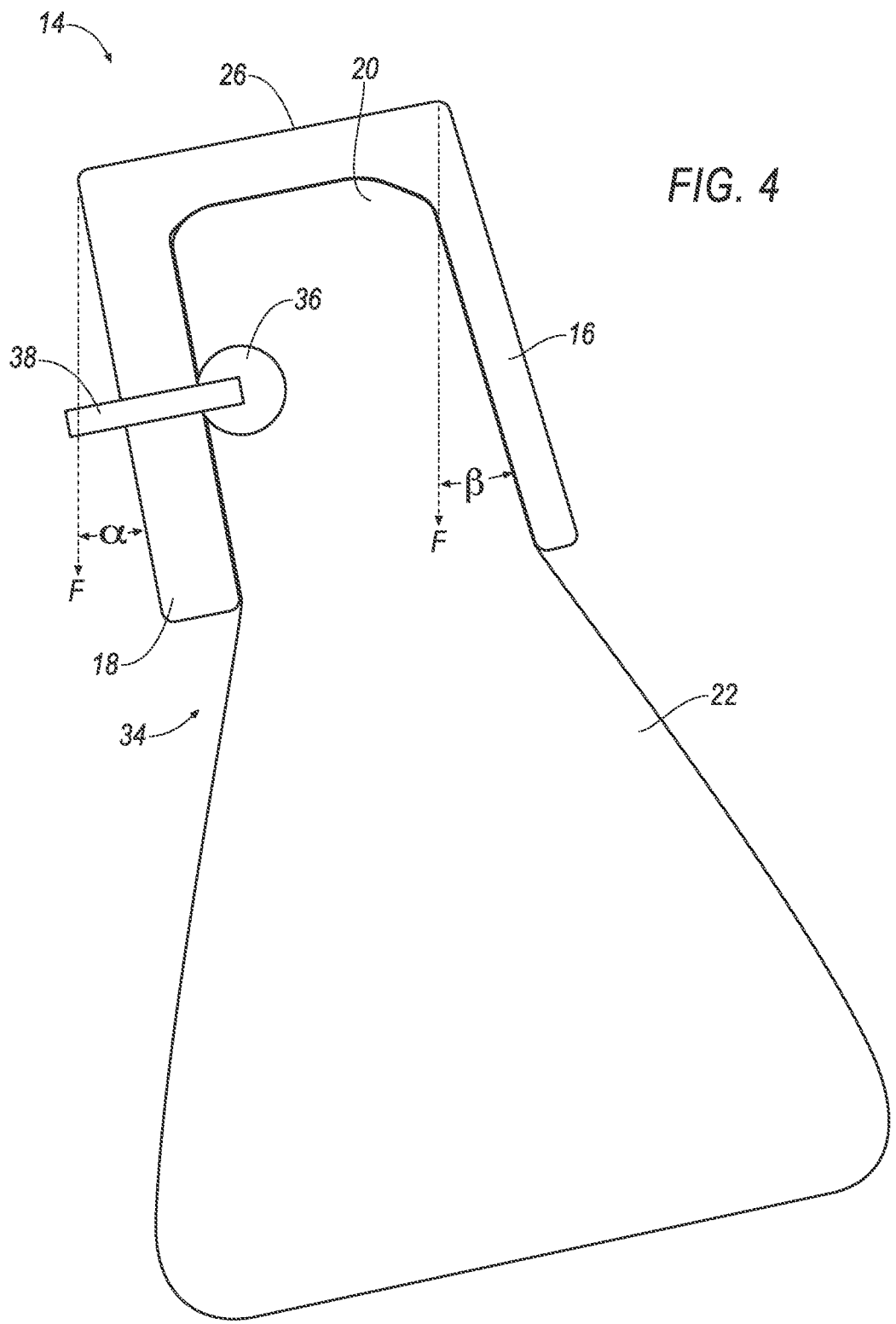
FIG. 4 is the cross-sectional view of FIG. 3 with the side airbag in an inflated position.

The frame member 14 includes the outer wall 16 and the inner wall 18, as shown in FIGS. 2-4. The outer wall 16 is outboard relative to the inner wall 18, i.e., spaced away from a center of the vehicle 12 when the seat 10 is in the neutral position. The outer wall 16 and the inner wall 18 define the cavity 20. That is, the outer wall 16 and the inner wall 18 are spaced to define the cavity 20 therebetween.

The frame member 14 may include a rear wall 26, as shown in FIGS. 3-4. The rear wall 26 may connect the outer wall 16 to the inner wall 18. The rear wall 26 is vehicle-rearward of the outer wall 16 and the inner wall 18. The rear wall 26 may define the cavity 20. That is, the rear wall 26, the outer wall 16, and the inner wall 18 may define three sides of the cavity 20, as shown in FIGS. 3-4. The outer wall 16, the inner wall 18, and the rear wall 26 may be unitary, i.e., formed together as a single construction. Alternatively, the outer wall 16, the inner wall 18, and the rear wall 26 may be separate pieces joined together with a suitable fastener, e.g., a weld, bolts, etc. The rear wall 26 may be two or more separate pieces joined together with fasteners, e.g., welded together.

The frame member 14 may include an upper wall 28 and a lower wall 30, as shown in FIG. 2. The upper wall 28 may be disposed above the outer wall 16, the inner wall 18, and the rear wall 26. The lower wall 30 may be disposed below the outer wall 16, the inner wall 18, and the rear wall 26. The upper wall 28 and the lower wall 30 define the cavity 20 with the inner wall 18, the outer wall 16, and the rear wall 26. That is, the upper wall 28, the lower wall 30, the inner wall 18, the outer wall 16, and the rear wall 26 form five sides of the cavity 20, and the frame member 14 is open in a direction away from the rear wall 26.

The inner wall 18 defines an outboard angle $\alpha$ relative to an axis along the seat-forward direction F, as shown in FIGS. 3-4. The outer wall 16 defines an outboard angle $\beta$ relative to the seat-forward direction F. The outboard angles $\alpha$, $\beta$ are positive in the outboard direction away from the seat-forward direction F. The outboard angles $\alpha$, $\beta$ allow the side airbag 22 to inflate in a direction away from the seat-forward direction F, as shown in FIG. 4. The outboard angle $\alpha$ may be different than the outboard angle $\beta$. Alternatively, the outboard angle $\alpha$ may be the same as the outboard angle $\beta$. The inner wall 18 extends along the outboard angle $\alpha$. The outer wall 16 extends along the outboard angle $\beta$. The frame member 14 may be open in the direction along the outboard angle $\beta$. That is, the rear wall 26, the inner wall 18, and the outer wall 16 may define the cavity 20 such that the direction along the outboard angle $\beta$ extends out from the frame member 14 without obstruction by the frame member 14. The outboard angle $\alpha$ may be $0° \leq \alpha < 30°$, and the outboard angle $\beta$ may be $0° < \beta < 30°$. That is, the outboard angle $\alpha$ may be zero, and the outboard angle $\beta$ is nonzero. The angles $\alpha$, $\beta$ may be determined to provide a specific inflation direction for the side airbag.

The frame 24 may include a second frame member 32, as shown in FIG. 2. The second frame member 32 may be transverse to the frame member 14, e.g., substantially perpendicular to the frame member 14. The second frame member 32 may be elongated generally in a plane P. The seat-forward direction F may be normal to the plane P, i.e., an axis normal to the plane P may extend along the seat-forward direction F. That is, the second frame member 32 may extend in a vehicle-crosswise direction and may support an upper torso of the occupant when the occupant is facing forward.

The seat 10 includes an airbag module 34, as shown in FIGS. 2-4. The airbag module 34 includes an inflator 36 and the side airbag 22. The inflator 36 is connected to the side airbag 22. The inflator 36 may be any suitable type, e.g., a cold-gas inflator. During the impact, the inflator 36 provides inflation medium to the side airbag 22, inflating the side airbag 22 along the outboard angle $\beta$, as shown in FIG. 4. The side airbag 22 may be formed of a woven polymer or any other material. As one example, the side airbag 22 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The seat 10 may include a stud 38. The stud 38 connects the inflator 36 to the frame member 14. For example, the stud 38 may connect the inflator 36 to the inner wall 18, as shown in FIGS. 3-4. Alternatively, not shown in the Figures, the stud 38 may connect the inflator 36 to the rear wall 26 or the outer wall 18. The stud 38 may connect the inflator 36 to the frame member 14 with a suitable fastener, e.g., a bolt, a weld, etc.

The side airbag 22 is inflatable to an inflated position along the outboard angle $\beta$. During the impact, the inflator 36 inflates the side airbag 22, and the side airbag 22 expands, engaging the inner wall 18, the outer wall 16, the rear wall 26, the upper wall 28, and the lower wall 30. Because the frame member 14 is open along the outboard angle $\beta$, the side airbag 22 inflates in a direction along the outboard angle $\beta$. The side airbag 22 inflates away from the seat-forward direction F and away from the occupant in the seat 10. Thus, the side airbag 22 inflates to absorb energy from the occupant within the limited space outboard of the frame member 14.

The seat 10 includes a seatbelt retractor 40, as shown in FIG. 1. The seatbelt retractor 40 houses a webbing 42 of a seatbelt. The occupant pulls the webbing 42 from the seatbelt retractor 40 to connect a tongue (not numbered in the Figures) to a buckle (not numbered in the Figures). When the seat 10 is rotatable and includes the seatbelt retractor 40, the seatbelt retractor 40 may rotate with the seat 10. Thus, the seatbelt may restrain the occupant in different rotatable positions of the seat 10.

The seatbelt retractor 40 may be fixed to the frame member 14. For example, the seatbelt retractor may be fixed at the top 44 of the frame member 14. That is, the frame 24 may include a retractor housing 46 to support the seatbelt retractor 40. The retractor housing 46 may be supported by the frame member 14. The seatbelt retractor 40 may be disposed between the outer wall 16 and the inner wall 18. The side airbag 22 may be disposed beneath the seatbelt retractor 40. By fixing the seatbelt retractor 40 to the frame member 14, the seatbelt retractor 40 may move with the frame member 14, e.g., when the seat 10 is a rotatable seat, to position the webbing 42 to restrain the occupant.

The seatbelt retractor 40 may be disposed above the upper wall 28, as shown in FIG. 2. The seatbelt retractor 40 may be supported by the upper wall 28, the outer wall 16, and/or the inner wall 18. For example, the seatbelt retractor 40 may directly contact the upper wall 28. Thus, the seatbelt retractor 40 may be disposed above the side airbag 22, allowing the side airbag 22 to deploy away from the center of the seat 10 to absorb energy from the occupant. The seatbelt retractor 40 may include fasteners to mate with slots in the frame member 14, fixing the seatbelt retractor to the frame member 14.

The frame member 14 may include a bottom arm 52. The bottom arm 52 may be connected to a seat bottom. The bottom arm 52 may extend from the lower wall 30 to the seat bottom. The frame member 14 may be connected to the second frame member 32 with the retractor housing 46 and may be connected to the seat bottom with the bottom arm 52. As shown in FIG. 2, the cavity 20 may be disposed between the bottom arm 52 and the retractor housing 46, i.e., the cavity 20 may be disposed along a straight line along the bottom arm 52 that passes through the retractor housing 46. Because the cavity 20 is between the retractor housing 46 and the bottom arm 52, the side airbag 26 may be disposed in the cavity 20 to deploy to the side of the occupant in the seat 10.

The seatbelt retractor 40 has a retractor width 48, as shown in FIG. 1. The retractor width 48 is a distance between opposing edges of seatbelt retractor 40 in a vehicle-crosswise direction. The retractor housing 46 may have a width that is the same as the retractor width 48 to support the seatbelt retractor 40, as shown in FIG. 2. The frame member 14 has a member width 50, i.e., a distance between the innermost portion of the inner wall 18 and the outermost portion of the outer wall 16. The retractor width 48 may be greater than the member width 50, i.e., the seatbelt retractor 40 may be wider than the frame member 14. When the retractor width 48 is greater than the member width 50, the frame 24 may require additional structure, such as the retractor housing 46, to support the seatbelt retractor 40, reducing deployment space for the side airbag 22. Thus, the outboard angles α, β direct deployment of the side airbag 22 away from a center of the seat 10 to absorb energy from the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat, comprising:
    a frame member including an outer wall and an inner wall, the outer wall and the inner wall defining a cavity therebetween, the outer wall spaced from the inner wall in a cross-seat direction perpendicular to a seat-forward direction;
    a seatbelt retractor fixed to the frame member; and
    a side airbag supported by the frame member in the cavity, the side airbag being disposed beneath the seatbelt retractor;
    wherein the outer wall extends along an outboard angle relative to the seat-forward direction and the side airbag is inflatable to an inflated position extending along the outboard angle.

2. The vehicle seat of claim 1, wherein the seatbelt retractor is between the outer wall and the inner wall.

3. The vehicle seat of claim 1, wherein the seatbelt retractor is fixed to a top of the frame member.

4. The vehicle seat of claim 1, wherein the frame member has a member width and the seatbelt retractor has a retractor width that is greater than the member width.

5. The vehicle seat of claim 1, wherein the inner wall extends along a second outboard angle relative to the seat-forward direction.

6. The vehicle seat of claim 1, wherein the inner wall extends along a second angle relative to the seat-forward direction that is different than the outboard angle.

7. The vehicle seat of claim 1, further comprising a stud and an inflator connected to the side airbag, the stud connecting the inflator to the frame member.

8. The vehicle seat of claim 1, further comprising a second frame member elongated generally in a plane, the second frame member transverse to the frame member, wherein the seat-forward direction is normal to the plane.

9. The vehicle seat of claim 1, further comprising a rear wall connecting the outer wall and the inner wall.

10. The vehicle seat of claim 9, further comprising an upper wall above the outer wall and the inner wall and a lower wall below the outer wall and the inner wall.

11. The vehicle seat of claim 10, wherein the side airbag engages the upper wall and the lower wall in the inflated position.

12. The vehicle seat of claim 10, wherein the seatbelt retractor is above the upper wall.

13. The vehicle seat of claim 10, wherein the frame member is open in a direction along the outboard angle.

14. The vehicle seat of claim 1, wherein the outer wall and the inner wall are integral.

15. The vehicle seat of claim 1, wherein the side airbag is designed to inflate away from an occupant in the vehicle seat.

16. A vehicle seat frame, comprising:
    a first frame member including an outer wall and an inner wall defining a cavity therebetween, the outer wall spaced from the inner wall in a cross-seat direction perpendicular to a seat-forward direction;
    a second frame member transverse to the first frame member and elongated generally in a plane; and
    an airbag module supported by the first frame member in the cavity;
    wherein the outer wall defines an outboard angle relative to an axis normal to the plane of the second frame member and the airbag module includes an airbag inflatable to an inflated position along the outboard angle.

17. The vehicle seat frame of claim 16, wherein the inner wall defines a second outboard angle relative to the axis.

18. The vehicle seat frame of claim 16, wherein the first frame member further includes a rear wall connecting the outer wall and the inner wall.

19. The vehicle seat frame of claim 16, further comprising a seatbelt retractor disposed at a top of the first frame member, wherein the airbag module is disposed beneath the seatbelt retractor.

20. A vehicle seat, comprising:
    a frame member including an outer wall and an inner wall, the outer wall and the inner wall defining a cavity therebetween;
    a seatbelt retractor fixed to the frame member, the seatbelt retractor disposed between the outer wall and the inner wall; and
    a side airbag supported by the frame member in the cavity, the side airbag being disposed beneath the seatbelt retractor;
    wherein the outer wall extends along an outboard angle relative to a seat-forward direction and the side airbag is inflatable to an inflated position extending along the outboard angle.

* * * * *